(12) United States Patent
Schulte et al.

(10) Patent No.: US 9,218,002 B2
(45) Date of Patent: Dec. 22, 2015

(54) STALL PREVENTION/RECOVERY SYSTEM AND METHOD

(75) Inventors: Kynn J. Schulte, Arlington, TX (US); Robert L. Fortenbaugh, Pantego, TX (US); Kenneth E. Builta, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 675 days.

(21) Appl. No.: 13/522,993

(22) PCT Filed: Feb. 7, 2011

(86) PCT No.: PCT/US2011/023849
§ 371 (c)(1),
(2), (4) Date: Jul. 19, 2012

(87) PCT Pub. No.: WO2011/100179
PCT Pub. Date: Aug. 18, 2011

(65) Prior Publication Data
US 2013/0030607 A1 Jan. 31, 2013

Related U.S. Application Data

(60) Provisional application No. 61/303,383, filed on Feb. 11, 2010.

(51) Int. Cl.
| B65D 25/00 | (2006.01) |
| G05D 1/00 | (2006.01) |
| G05D 1/08 | (2006.01) |

(52) U.S. Cl.
CPC ............ G05D 1/0061 (2013.01); G05D 1/0816 (2013.01)

(58) Field of Classification Search
CPC .. G05D 1/0816; G05D 1/0061; G05D 1/0858; G05D 1/0607; B64D 25/00; G01C 23/005; B64C 29/0033
USPC .................. 701/2, 14, 467, 492; 244/180, 7 R
See application file for complete search history.

(56) References Cited

U.S. PATENT DOCUMENTS

| 3,018,072 A | 1/1962 | Meyers et al. |
| 3,116,042 A | 12/1963 | Richter |

(Continued)

OTHER PUBLICATIONS

Supplementary European Search Report from corresponding European Application No. 11742653 issued from the European Patent Office dated Apr. 13, 2013.

(Continued)

*Primary Examiner* — Tuan C. To
*Assistant Examiner* — Yuri Kan
(74) *Attorney, Agent, or Firm* — James E. Walton

(57) ABSTRACT

A method for operating an aircraft to prevent/recover from a stall condition includes the steps of detecting an actual vertical velocity of the aircraft, calculating vertical velocity error of the aircraft, the vertical velocity error being based upon a comparison between the actual vertical velocity of the aircraft and a commanded vertical velocity of the aircraft, and determining if the aircraft is in one of a near stalled condition and a stalled condition based upon at least the detected vertical velocity error and the polarity of the vertical velocity error. The method further includes the steps of taking control of the aircraft from an operator of the aircraft, reducing a bank angle of the aircraft, pitching the aircraft downward, and increasing the airspeed of the aircraft if the aircraft's airspeed is outside an airspeed window if the aircraft is in one of the near stalled condition and the stalled condition.

20 Claims, 5 Drawing Sheets

(56) References Cited

U.S. PATENT DOCUMENTS

| | | | | |
|---|---|---|---|---|
| 3,181,810 | A | * | 5/1965 | Olson .......................... 244/7 R |
| 4,012,626 | A | * | 3/1977 | Miller et al. .................. 701/492 |
| 4,326,253 | A | | 4/1982 | Cooper et al. |
| 4,442,490 | A | | 4/1984 | Ross |
| 5,730,394 | A | * | 3/1998 | Cotton et al. ................ 244/180 |
| 6,236,914 | B1 | | 5/2001 | Kaloust |
| 6,246,929 | B1 | | 6/2001 | Kaloust |
| 7,006,904 | B2 | | 2/2006 | Pippenger |
| 2004/0093130 | A1 | | 5/2004 | Osder et al. |
| 2007/0016343 | A1 | | 1/2007 | Hanel |
| 2009/0082954 | A1 | * | 3/2009 | Ridenour, II .................. 701/206 |
| 2010/0004803 | A1 | * | 1/2010 | Manfredi et al. ............... 701/14 |

OTHER PUBLICATIONS

"Automatic limiters in Air Force aircraft flight control systems", by Kogler, Richard H., dated May 23, 1988, pp. 461-469.

"Airplane Upset Recovery Training Aid Revision 2", dated Nov. 1, 2008, retrieved http://www.faa.gov/other_visit/aviation_industry/airline_operators/training/media/AP_upsetRecovery_book.pdf Chapter 2.6.

Office Action dated Dec. 1, 2014 from counterpart CN App. No. 201180009317.6.

First Office Action from corresponding Chinese Application No. 2011800093176 issued from the Patent Office of the People's Republic of China dated Apr. 8, 2014.

Summons to Attend Oral Proceedings from corresponding European Application No. 11742653 issued from the European Patent Office dated Jun. 10, 2014.

Office Action dated Jul. 24, 2014 from counterpart CA App. No. 2,789,269.

Federal Aviation Administration, "Airplane Upset Recovery Training Aid Revision 2," Nov. 2008, XP055059758, retrieved from the internet: URL: http://www.faa.gov/other_visit/aviation_industry/airline_operators/training/media/AP_UpsetRecovery_Book.pdf, retrieved on Jul. 3, 2014.

International Search Report and the Written Opinion of the International Searching Authority mailed by ISA/US on Mar. 28, 2011 for International Patent Application No. PCT/US2011/023849, 12 pages.

Office Action from corresponding European Application No. 11742653 issued from the European Patent Office dated Dec. 6, 2013.

Office Action from corresponding Canadian application No. 2,789,269 dated Jul. 17, 2013 issued from the Canadian Intellectual Property Office.

Office Action dated May 2015 from counterpart CN App. No. 201180009317.6.

* cited by examiner

STALL PREVENTION/RECOVERY SYSTEM AND METHOD

TECHNICAL FIELD

The system and method of the present application relate to automated flight control systems.

DESCRIPTION OF THE PRIOR ART

In aerodynamics, a stall occurs when an airfoil of the aircraft cannot produce sufficient lift to support the aircraft at a particular airspeed and bank angle. Furthermore, a stall can occur when an excessive "angle of attack" of the airfoil results in a massive increase in drag and a loss of lift due to the disruption of airflow. The angle of attack is the angle between the airfoil's chord line and the direction of airflow. To maintain a given amount of lift, the angle of attack must be increased as speed through the air decreases. Stalling is an effect that occurs more frequently at lower speeds, although stalling can occur at any speed. Stalling causes an aircraft to lose altitude and aerodynamic control, and may lead to a crash if not quickly corrected.

Many devices have been developed to affect when and where a stall forms. For example, stall strips are small, sharp-edged devices attached to the leading edge of an airfoil that promote stall formation at the leading edge of the airfoil, resulting in a gentle, progressive stall. Vortex generators are small strips that are placed on top of the airfoil near the leading edge, which lower the stall speed by inhibiting airflow separation over the top of the wing. An anti-stall strake is an airfoil extension at the root leading edge of the airfoil, which generates a vortex on the wing upper surface to postpone the stall. Such devices, however, prevent stalls only in certain operational scenarios.

Other devices have been developed to warn a pilot when a stall begins. For example, a stick-shaker shakes the pilot's controls to warn of the onset of a stall. A stall warning device is an electronic or mechanical device that sounds an audible warning as the stall speed is reached. When the pilot is made aware of the stall, maneuvers are initiated by the pilot to exit the stall condition. The pilot, however, may make mistakes during stall recovery maneuvers. Such warning devices are not generally useful in the operation of remotely piloted aircraft.

Other aircraft are designed to restrict the flight envelope to a range of aerodynamic conditions that will not cause a stall. Such aircraft, however, may not be capable of performing in desired aerodynamic scenarios.

There are many devices that mitigate the deleterious effects of stalls well known in the art; however, considerable room for improvement remains.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1A:
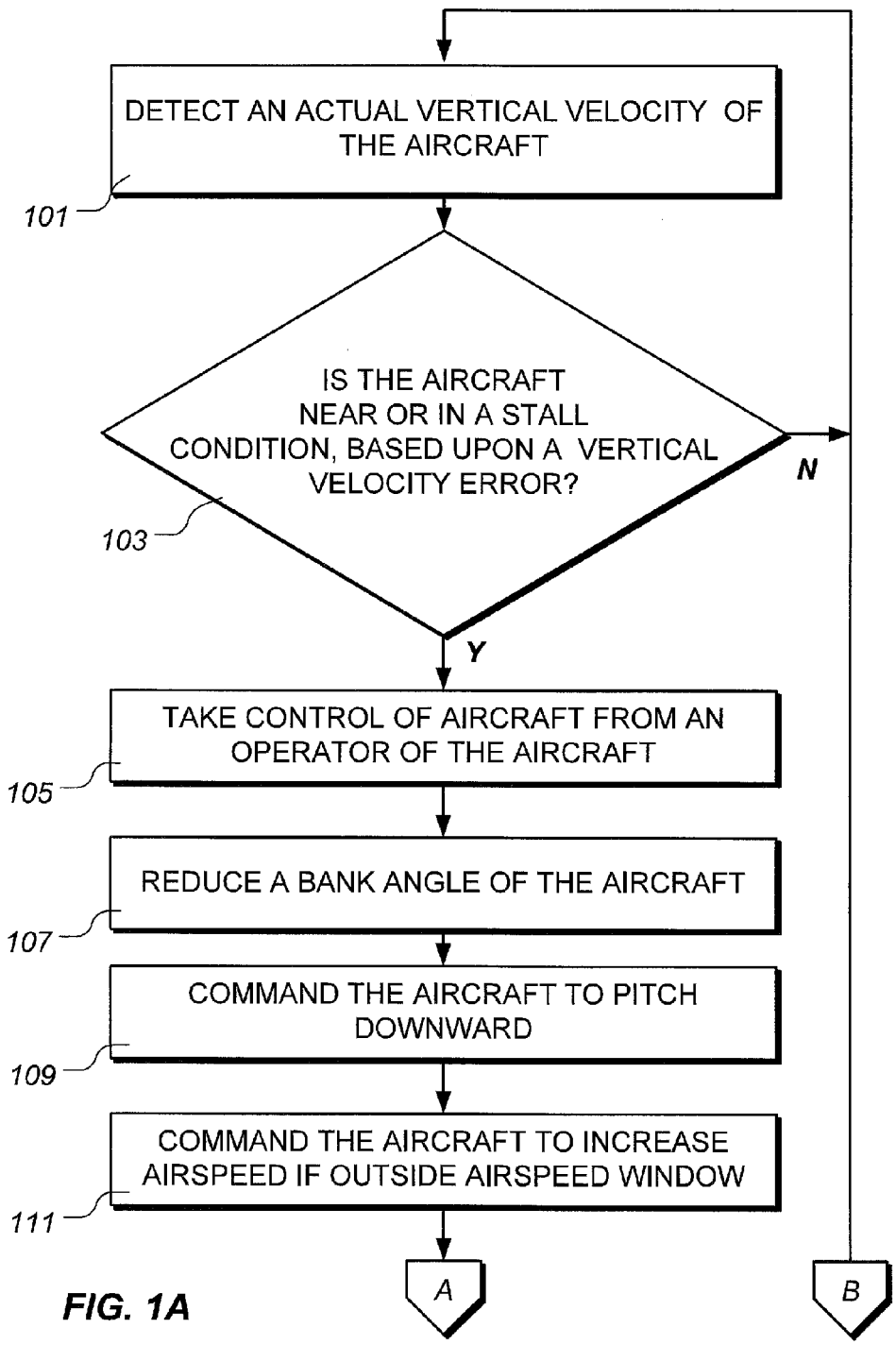
FIGS. 1A and 1B are flowcharts depicting an illustrative method according to the present application for operating an aircraft to prevent/recover from a stall condition.

While the system of the present application is susceptible to various modifications and alternative forms, specific embodiments thereof have been shown by way of example in the drawings and are herein described in detail. It should be understood, however, that the description herein of specific embodiments is not intended to limit the system to the particular forms disclosed, but on the contrary, the intention is to cover all modifications, equivalents, and alternatives falling within the spirit and scope of the present application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present application represents a system and method for preventing the occurrence of aerodynamic stalls and for recovering from aerodynamic stall conditions. In one embodiment, the system and method are computer-implemented. In such an embodiment, the method takes on the form of software encoded in media that, when executed, is operable to prevent the occurrence of aerodynamic stalls and to recover from aerodynamic stall conditions. The system of the present application detects if an aircraft's vertical velocity error as computed by taking the difference of the commanded vertical velocity and the aircraft's actual vertical velocity exceeds a predetermined margin and is of a polarity indicating that insufficient lift or power exists to maintain the commanded vertical velocity. This set of conditions automatically engages stall prevention/recovery steps to correct the detected stall or near-stall condition. If, however, the vertical velocity error exceeds the predetermined margin, but the polarity is in a direction that a stall or near-stall is not imminent, then the stall prevention/recovery steps are not engaged.

There is a need for an improved system and method to detect, avoid, and/or recover from stall conditions in an aircraft.

Therefore, it is an object of the present application to provide an improved system and method to detect, avoid, and/or recover from stall conditions in an aircraft.

This and other objects are achieved by providing a method for operating an aircraft to prevent/recover from a stall condition. The method includes the detection of a near stall or stalled condition followed by a recovery from the stall or near-stall condition. This includes the steps of computing a velocity error whose amplitude and polarity determine if an aircraft is in either a stalled or near stalled condition during the detection phase. The method further includes the steps of taking control of the aircraft from an operator of the aircraft during the recovery phase. These steps include reducing a bank angle of the aircraft, pitching the aircraft downward, and increasing the airspeed of the aircraft if the aircraft's airspeed is outside an airspeed window, while monitoring the aircraft's new vertical velocity, new vertical velocity error, vertical acceleration, and airspeed to determine if the aircraft is still in either the near stalled condition or the stalled condition.

In another aspect of the present application, a system for operating an aircraft to prevent/recover from a stall condition is provided. The system includes one or more components collectively operable to compute the actual vertical velocity error of the aircraft and determine if the aircraft is in either a near stalled condition or a stalled condition based upon the detected vertical velocity error of the aircraft during the detection phase. If the aircraft is in one of the near stalled condition or the stalled condition and enters the recovery phase, the system is further operable to take control of the aircraft from an operator of the aircraft, reduce a bank angle of the aircraft, pitch the aircraft downward, and increase the airspeed of the aircraft if the aircraft's airspeed is outside an airspeed window while monitoring the aircraft's new vertical velocity, new vertical velocity error, vertical acceleration, and airspeed to determine if the aircraft is still in either the near stalled condition or the stalled condition.

In yet another aspect of the present application, software for operating an aircraft to prevent/recover from a stall condition is provided. The software is encoded in media and, when executed, is operable to compute the actual vertical velocity error of the aircraft and determine if the aircraft is in either a near stalled condition or a stalled condition based upon at least the detected vertical velocity error of the aircraft during the detection phase. If the aircraft is in either the near stalled condition or the stalled condition and enters the recovery phase, the software is further operable to take control of the aircraft from an operator of the aircraft, reduce a bank angle of the aircraft, pitch the aircraft downward, and increase the airspeed of the aircraft if the aircraft's airspeed is outside an airspeed window while monitoring the aircraft's new vertical velocity, new vertical velocity error, vertical acceleration, and airspeed to determine if the aircraft is still in either the near stalled condition or the stalled condition.

It should be noted that the term "aircraft," as it is used herein, means a machine or device capable of atmospheric flight, such as an airplane or other fixed-wing aircraft; a helicopter; or a tiltrotor aircraft, which uses tiltable (pivoting) propellers or "proprotors" for lift and propulsion.

Figure 1B:
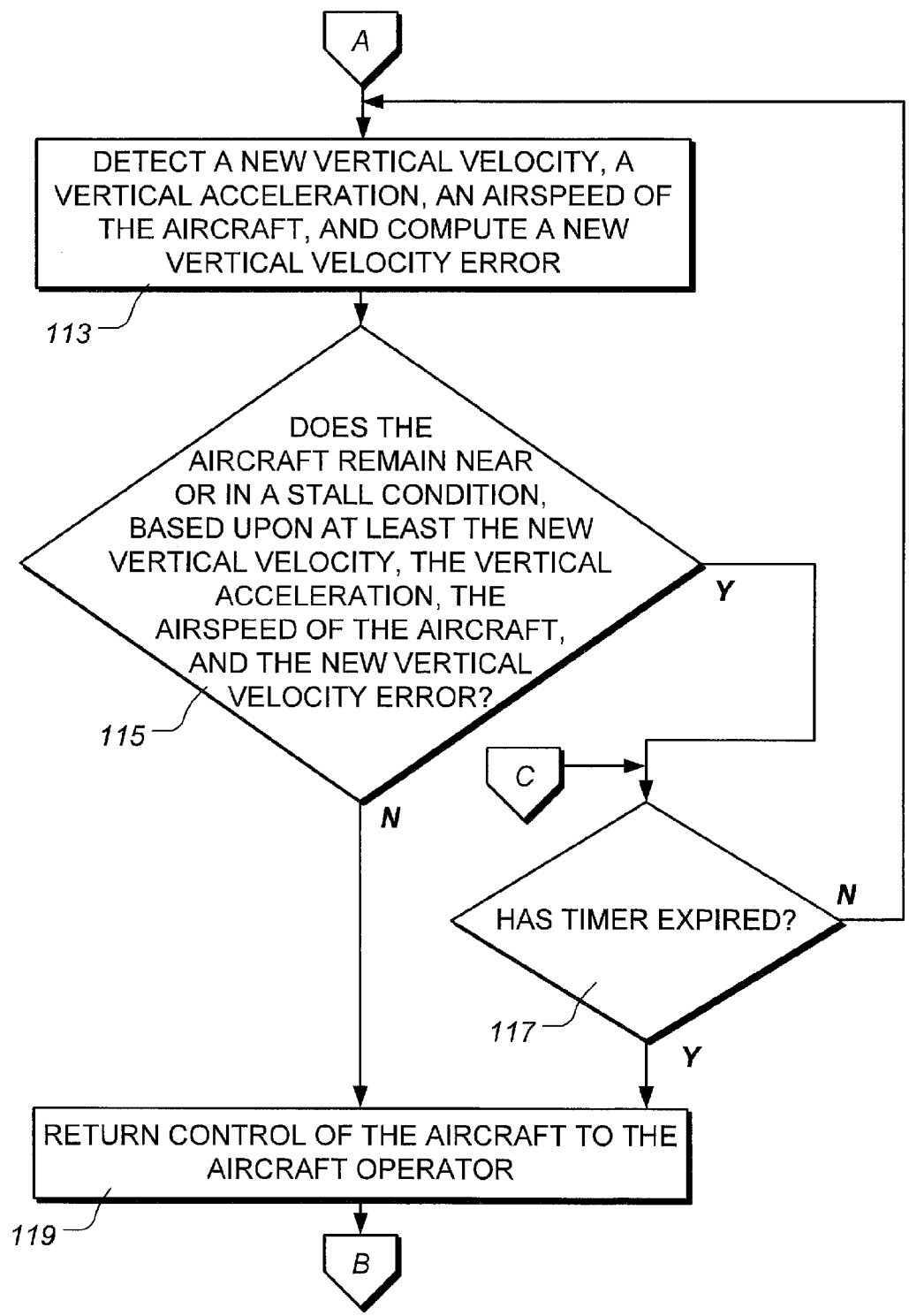

FIGS. 1A and 1B depict an illustrative embodiment of a method for automatically recovering from an aerodynamic stall or near-stall condition in an aircraft. In one embodiment, the illustrated method is computer-implemented and performed using one or more computer systems each comprising one or more processing units and one or more memory units, as will be more fully discussed below.

Figure 2:
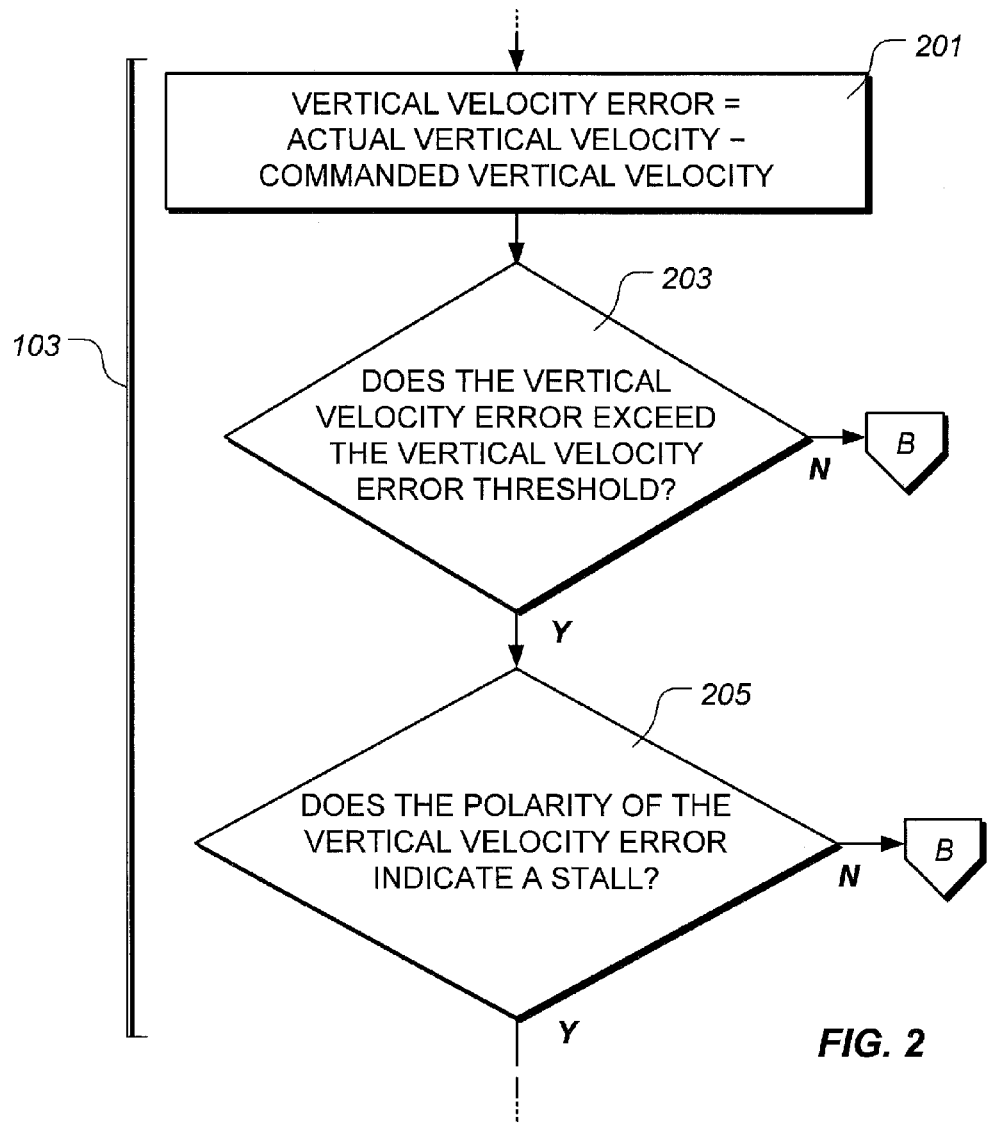
FIG. 2 is a flowchart depicting an illustrative method for accomplishing one particular step of the method of FIGS. 1A and 1B.

Referring to FIG. 1A, the illustrated method includes the step of detecting an actual vertical velocity (i.e., velocity in an Earth vertical direction) of the aircraft (step 101). Step 101 may be accomplished by detecting the vertical velocity of the aircraft directly from one or more sensors that specifically provide the vertical velocity of the aircraft, such as Doppler systems, RADAR systems, air data sensors, inertial navigation sensors, or the like. Alternatively, step 101 may be accomplished by calculating the vertical velocity of the aircraft based upon data from one or more sensors or systems. In step 103, a determination is made whether the aircraft is nearing a stall condition or in a stall condition, based upon at least a vertical velocity error of the aircraft. One particular method for accomplishing step 103 is depicted in FIG. 2 and described herein.

If the aircraft is neither near a stall condition or in a stall condition, the method returns to step 101, wherein a new vertical velocity is detected. As long as the aircraft is neither near a stall condition nor in a stall condition, the method repeatedly performs steps 101 and 103.

If, however, the aircraft is near a stall condition or in a stall condition, based upon the results of step 103, control is taken from an operator of the aircraft in step 105. The illustrated method commands the aircraft to reduce a bank angle of the aircraft in step 107. The bank angle is the amount of rotation of the aircraft about a longitudinal axis extending from the nose to the tail of the aircraft. If the aircraft has a zero bank angle, a pitch axis of the aircraft, which extends from the left side to the right side of the aircraft, is perpendicular to the Earth vertical. The bank angle may be detected directly from one or more sensors, such as a gyroscope or the like. In one embodiment, the bank angle is reduced by one-half, although other reductions are possible and encompassed with the scope of the present application.

The illustrated method commands the aircraft to pitch downward (i.e., orient a nose end of the aircraft downward by rotation about the pitch axis) in an Earth vertical direction in step 109. The degree to which the aircraft is commanded to pitch downward is implementation specific, depending at least upon the configuration of the aircraft.

Still referring to FIG. 1A, step 111 commands the aircraft to increase airspeed if the aircraft's airspeed is outside a predetermined window. For example, if the aircraft's airspeed is lower than a predetermined, minimum airspeed, the aircraft is commanded to increase airspeed. If, however, the aircraft's airspeed is greater than or equal to the predetermined, minimum airspeed, no change is commanded to the aircraft's airspeed.

Following marker A in FIG. 1A to FIG. 1B, step 113 detects a new vertical velocity, a vertical acceleration, an airspeed of the aircraft, and computes a new vertical velocity error. The new vertical velocity and the vertical acceleration are detected using any suitable means, such as the sensors described above concerning step 101 of FIG. 1A. The airspeed is also detected using any suitable means, such as by using a pitot air data system or the like.

Figure 3:
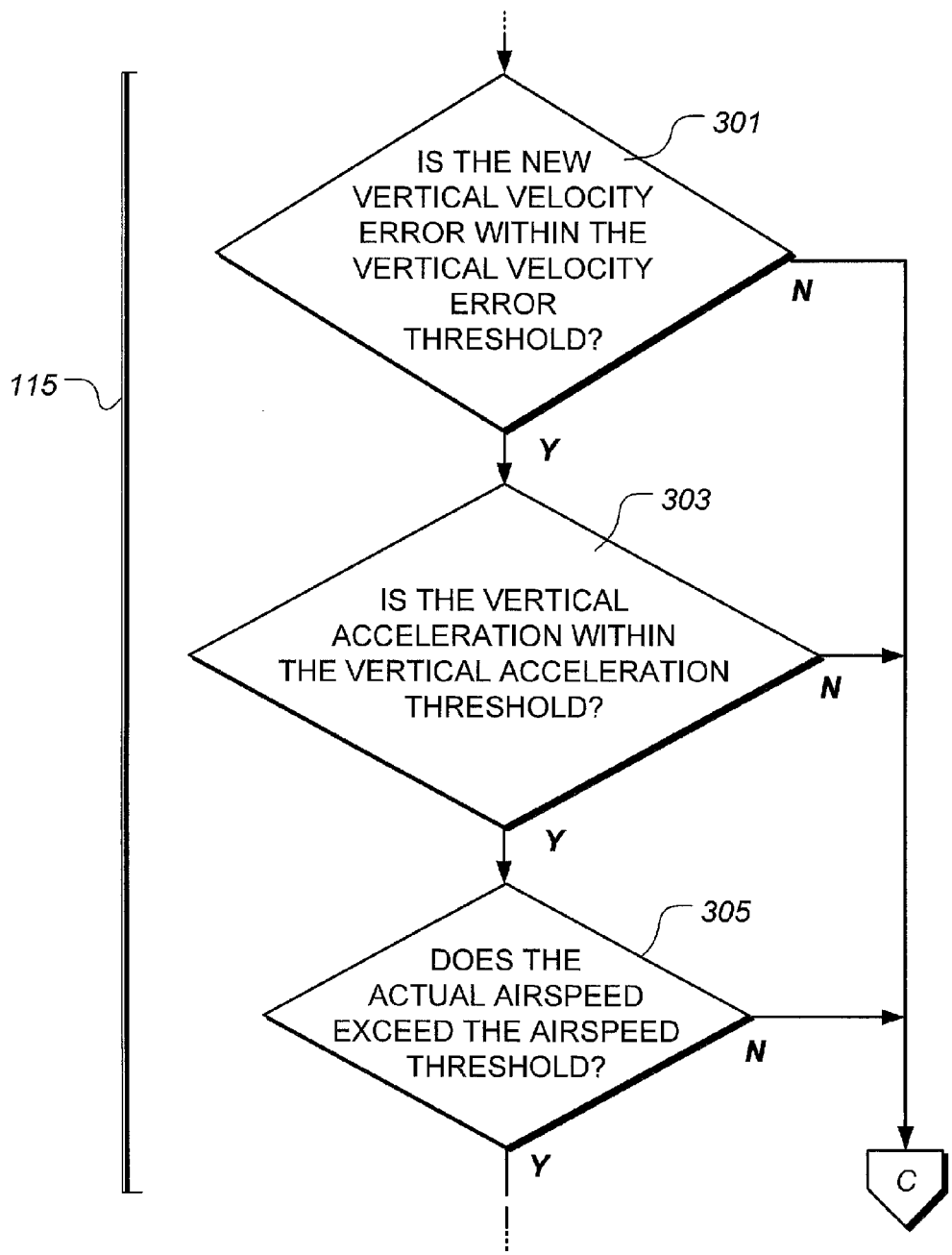
FIG. 3 is a flowchart depicting an illustrative method for accomplishing one particular step of the method of FIGS. 1A and 1B.

In step 115, a determination is made whether the aircraft is near a stall condition or in a stall condition, based upon at least the new vertical velocity, the new computed vertical velocity error, the vertical acceleration, and the airspeed of the aircraft. One particular method for accomplishing step 115 is depicted in FIG. 3 and described herein.

If the aircraft remains near a stall condition or in a stall condition, the method initiates a timer and determines, in step 117, if the timer has expired. If the timer has not expired, steps 113, 115, and 117 are again executed, until either the aircraft is neither near nor in a stall condition (step 115) or the timer has expired (step 117). When the aircraft is neither near nor in a stall condition or the timer has expired, control of the aircraft is returned to the operator in step 119 and the method returns to step 101 (following marker B from FIG. 1B to FIG. 1A).

If, however, the aircraft is neither near a stall condition or in a stall condition (step 115), control of the aircraft is returned to the operator in step 119 and the method returns to step 101 (following marker B from FIG. 1B to FIG. 1A).

FIG. 2 depicts an illustrative embodiment of a method for accomplishing step 103 of FIG. 1A. According to the illustrated method, step 201 calculates the vertical velocity error, which is a commanded vertical velocity subtracted from the actual vertical velocity of the aircraft. In step 203, the vertical velocity error is compared to a vertical velocity error threshold. If the vertical velocity error does not exceed the threshold, e.g., the vertical velocity is within an acceptable window, the aircraft is neither near nor in a stall condition and step 101 (FIG. 1A) is again executed (following marker B from FIG. 2 to FIG. 1A).

If, however, the vertical velocity error exceeds the vertical velocity error threshold (step 203), the vertical velocity error is checked in step 205 to determine its polarity. If the polarity of the vertical velocity error is not in a direction indicating a stall or near-stall condition, step 101 (FIG. 1A) is again executed (following marker B from FIG. 2 to FIG. 1A). If, however, the polarity of the vertical velocity error is in a direction indicating a stall or near-stall condition, step 105 (FIG. 1A) is executed.

FIG. 3 depicts an illustrative embodiment of a method for accomplishing step 115 of FIG. 1B. In the illustrated method, step 301 determines if the new vertical velocity error is within the vertical velocity error threshold. In one embodiment, step 301 is determined by carrying out steps corresponding to steps 201 and 203 of FIG. 2. If the new vertical velocity error is found to be within the vertical velocity error threshold in step 301, step 303 determines if the vertical acceleration is found to be within a vertical acceleration threshold. If the vertical acceleration is within the vertical acceleration threshold, step 305 determines if the actual aircraft airspeed exceeds the airspeed threshold. If the actual airspeed exceeds the airspeed threshold, the aircraft is determined to be neither in or near a stall condition and control is returned to the operator in step 119 (FIG. 1B).

If, however, the vertical velocity is determined in step 301 to be outside the vertical velocity threshold, or the vertical acceleration is determined in step 303 to be outside the vertical acceleration threshold, or the actual aircraft airspeed is determined in step 305 to be below the airspeed threshold, step 117 (see FIG. 1B, following marker C) is executed to determine if the timer has expired.

Figure 4:
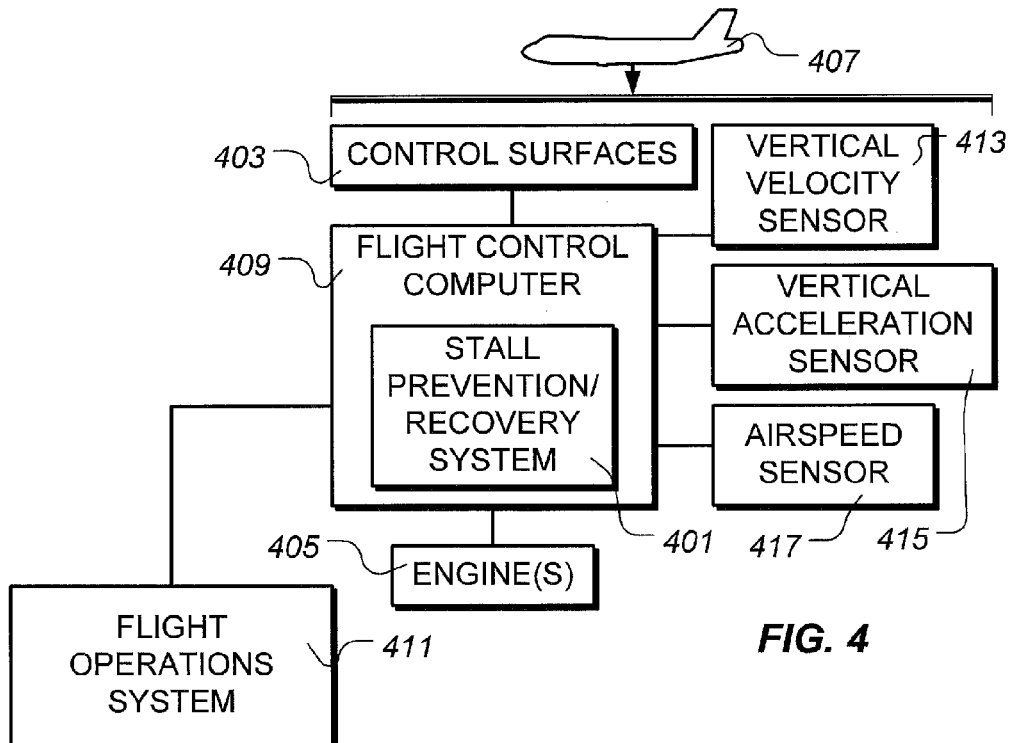
FIG. 4 is a schematic view of a first illustrative embodiment of a system for operating an aircraft to prevent/recover from a stall condition.

FIG. 4 provides a schematic depiction of a first illustrative embodiment of a computer-implemented, stall prevention/recovery system 401 operable to control surfaces 403 and/or one or more engines 405 of an aircraft 407 to prevent or recover from a stall condition of aircraft 407. In one embodiment, a flight control computer 409 operates control surfaces 403 and engines 405 under normal flight conditions, based upon inputs from an operator, such as a pilot. For the purposes of this disclosure, the term "normal flight conditions" means flight conditions wherein aircraft 407 is neither near a stall condition nor in a stall condition. In implementations wherein aircraft 407 is an unmanned aerial vehicle, remotely piloted vehicle, or the like, the operator provides inputs to flight control computer 409 via a flight operations system 411.

In the illustrated embodiment, stall prevention/recovery system 401 is incorporated into flight control computer 409. The present application, however, contemplates an embodiment wherein stall prevention/recovery system 401 is separate from flight control computer 409 but is on-board aircraft 407 and is in communication with flight control computer 409. Stall prevention/recovery system 401 executes the method of FIGS. 1A and 1B including, in various implementations, the embodiment of step 103 shown in FIG. 2 and the embodiment of step 115 shown in FIG. 3. In other words, stall prevention/recovery system 401 comprises one or more computer systems each comprising one or more processing units and one or more memory units. The one or more computer systems are collectively operable to execute the method of FIGS. 1A and 1B, as discussed above. In stall prevention/recovery system 401, the method of FIGS. 1A and 1B including, in various implementations, the embodiment of step 103 shown in FIG. 2 and/or the embodiment of step 115 shown in FIG. 3 takes on the form of software embodied in a computer-readable medium that, when executed, is operable to prevent a stall condition of aircraft 407 and/or recover from a stall condition of aircraft 407.

Stall prevention/recovery system 401 uses sensed condition data from a vertical velocity sensor 413, a vertical acceleration sensor 415, and an airspeed sensor 417 in the execution of the method of FIGS. 1A and 1B including, in various implementations, the embodiment of step 103 shown in FIG. 2 and the embodiment of step 115 shown in FIG. 3. Moreover, stall prevention/recovery system 401 issues commands, via flight control computer 409, to effect orientation changes in control surfaces 403 and/or to effect operational changes to engines 405.

Figure 5:
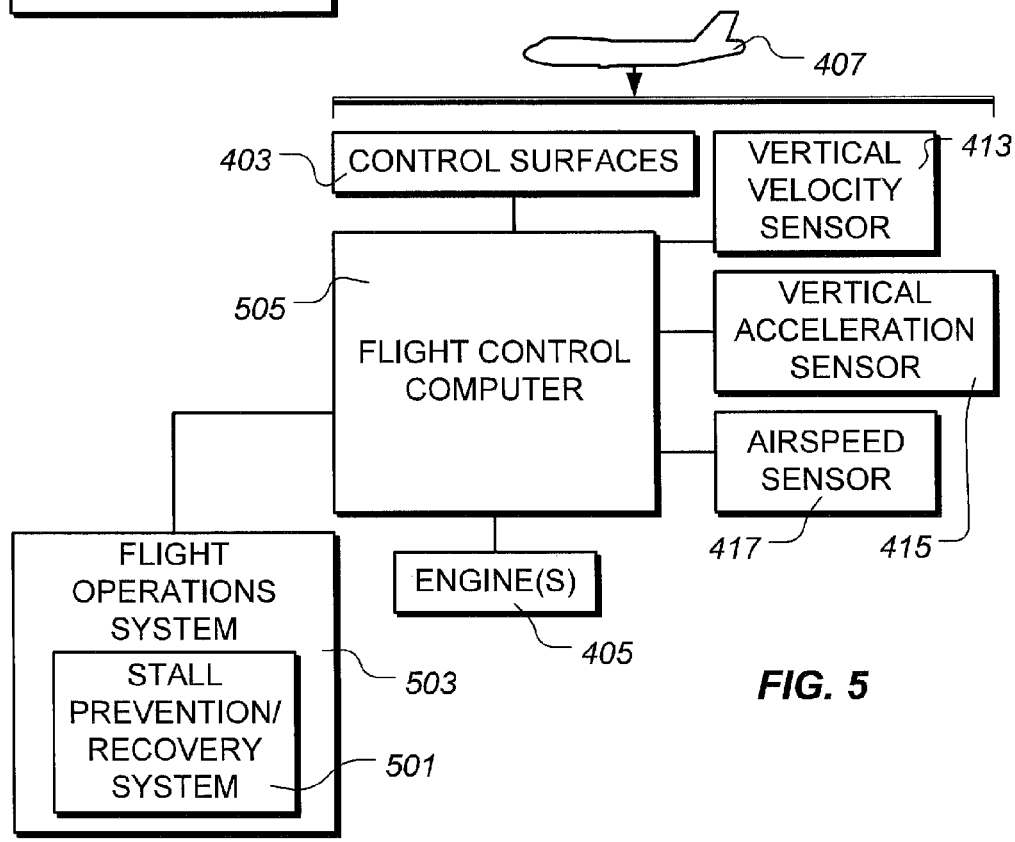
FIG. 5 is a schematic view of a second illustrative embodiment of a system for operating an aircraft to prevent/recover from a stall condition.

FIG. 5 provides a schematic depiction of a second illustrative embodiment of a computer-implemented, stall prevention/recovery system 501 operable to manage control surfaces 403 and/or engines 405 of aircraft 407 to prevent or recover from a stall condition of aircraft 407. In the embodiment illustrated in FIG. 5, stall prevention/recovery system 501 is incorporated into flight operations system 503. The present application, however, contemplates embodiments wherein stall prevention/recovery system 501 is incorporated into a system other than flight operations system 503, is in communication with flight operations system 503, but is not on-board aircraft 407 (e.g., as part of flight control computer 505). Other aspects of the embodiment illustrated in FIG. 5 correspond with the aspects of the embodiment illustrated in FIG. 4 and discussed above.

The system and method of the present application provides significant advantages, including: (1) providing a means to automatically detect and then avoid and/or recover from stall conditions rather than to merely warn of the occurrence of a stall condition; (2) providing a means, other than limiting the operational envelope of the aircraft, to avoid stall conditions; (3) providing a means to eliminate human error during stall recovery operations; and (4) providing a means to detect, avoid, and/or recover from stall conditions in unmanned aerial vehicles or remotely piloted vehicles.

The particular embodiments disclosed above are illustrative only, as the system and method may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the present application. Accordingly, the protection sought herein is as set forth in the claims below. It is apparent that a system and method with significant advantages has been described and illustrated. Although the system and method of the present application are shown in a limited number of forms, it is not limited to just these forms, but is amenable to various changes and modifications without departing from the spirit thereof.

The invention claimed is:

1. A method for operating an aircraft to prevent/recover from a stall condition, comprising the steps of:
   providing a flight control computer;
   detecting an actual vertical velocity of the aircraft;
   calculating a vertical velocity error of the aircraft, the vertical velocity error being based upon a comparison between the actual vertical velocity of the aircraft and a commanded vertical velocity of the aircraft;
   determining if the aircraft is in one of a near stalled condition and a stalled condition based primarily upon the detected vertical velocity error and the polarity of the vertical velocity error; and
   if the aircraft is in one of the near stalled condition and the stalled condition:
      taking control of the aircraft from an operator of the aircraft so that the operator does not have control authority of the aircraft;
      reducing a bank angle of the aircraft;
      pitching the aircraft downward; and
      increasing the airspeed of the aircraft if the aircraft's airspeed is outside an airspeed window;
   detecting a new vertical velocity of the aircraft;
   calculating a new vertical velocity error;
   detecting a vertical acceleration of the aircraft;
   detecting an airspeed of the aircraft;
   determining if the aircraft is in one of a near stalled condition and a stalled condition based upon at least the calculated new vertical velocity error of the aircraft and a polarity of the new vertical velocity error of the aircraft;
   determining if a timer has expired if the aircraft is in one of a near stalled condition and a stalled condition; and
   returning control of the aircraft to the aircraft operator if the aircraft is not in one of a near stalled condition and a stalled condition.

2. The method, according to claim 1, wherein the step of determining if the aircraft is in one of the near stalled condition and the stalled condition is accomplished by:
   determining if the vertical velocity error exceeds the vertical velocity error threshold and the polarity of the vertical velocity error is in a direction indicating a stall or near-stall condition.

3. The method, according to claim 1, wherein the step of calculating the vertical velocity error of the aircraft is accomplished by subtracting the actual vertical velocity from the commanded vertical velocity.

4. The method, according to claim 1, wherein the step of determining if the aircraft is in one of a near stalled condition and a stalled condition based upon at least the calculated new vertical velocity error of the aircraft and a polarity of the new vertical velocity error of the aircraft is accomplished by:
   determining if the new vertical velocity error is within a vertical velocity error threshold;
   determining if the vertical acceleration is within a vertical acceleration threshold; and
   determining if the actual airspeed exceeds an airspeed threshold.

5. The method, according to claim 4, wherein the step of determining if the new vertical velocity error is within the vertical velocity error threshold is accomplished by:
   calculating the new vertical velocity error of the aircraft by subtracting the new vertical velocity from the commanded vertical velocity; and
   comparing the new vertical velocity error to the vertical velocity error threshold.

6. A system for operating an aircraft to prevent/recover from a stall condition, the system comprising one or more components collectively operable to:
   detect an actual vertical velocity of the aircraft with a vertical velocity sensor;
   calculate a vertical velocity error of the aircraft, the vertical velocity error being based upon a comparison between the actual vertical velocity of the aircraft and a commanded vertical velocity of the aircraft;
   determine if the aircraft is in one of a near stalled condition and a stalled condition based primarily upon the detected vertical velocity error and the polarity of the vertical velocity error; and
   if the aircraft is in one of the near stalled condition and the stalled condition:
      take control of the aircraft from an operator of the aircraft so that the operator does not have control authority of the aircraft;
      reduce a bank angle of the aircraft;
      pitch the aircraft downward; and
      increase the airspeed of the aircraft if the aircraft's airspeed is outside an airspeed window;
   detect a new vertical velocity of the aircraft;
   calculate a new vertical velocity error;
   detect a vertical acceleration of the aircraft;
   detect an airspeed of the aircraft;
   determine if the aircraft is in one of a near stalled condition and a stalled condition based upon at least the calculated new vertical velocity error of the aircraft and a polarity of the new vertical velocity error of the aircraft;
   determine if a timer has expired if the aircraft is in one of a near stalled condition and a stalled condition; and
   return control of the aircraft to the aircraft operator if the aircraft is not in one of a near stalled condition and a stalled condition.

7. The system, according to claim 6, wherein the components are collectively operable to:
   determine if the vertical velocity error exceeds the vertical velocity error threshold and the polarity of the vertical velocity error is in a direction indicating a stall or near-stall condition.

8. The system, according to claim 6, wherein the components are collectively operable to calculate the vertical velocity error of the aircraft by subtracting the actual vertical velocity from the commanded vertical velocity.

9. The system, according to claim 6, wherein the components are collectively operable to:
   determine if the new vertical velocity error is within a vertical velocity error threshold;
   determine if the vertical acceleration is within a vertical acceleration threshold; and
   determine if the actual airspeed exceeds an airspeed threshold.

10. The system, according to claim 9, wherein the components are collectively operable to determine if the new vertical velocity is within the vertical velocity threshold by subtracting the new vertical velocity from the commanded velocity to produce a new vertical velocity error and comparing the new vertical velocity error to a vertical velocity threshold.

11. The system, according to claim 6, wherein the system is incorporated into a flight control computer.

12. The system, according to claim 6, wherein the system is on-board the aircraft.

13. The system, according to claim 6, wherein the system in incorporated into a flight operations system operable to control a remotely piloted vehicle.

14. Software for operating an aircraft to prevent/recover from a stall condition, the software encoded in non-transitory media and, when executed, operable to:
- detect an actual vertical velocity of the aircraft;
- calculate a vertical velocity error of the aircraft, the vertical velocity error being based upon a comparison between the actual vertical velocity of the aircraft and a commanded vertical velocity of the aircraft;
- determine if the aircraft is in one of a near stalled condition and a stalled condition based primarily upon the detected vertical velocity error and the polarity of the vertical velocity error; and
- if the aircraft is in one of the near stalled condition and the stalled condition:
  - take control of the aircraft from an operator of the aircraft so that the operator does not have control authority of the aircraft;
  - reduce a bank angle of the aircraft;
  - pitch the aircraft downward; and
  - increase the airspeed of the aircraft if the aircraft's airspeed is outside an airspeed window;
- detect a new vertical velocity of the aircraft;
- calculate a new vertical velocity error;
- detect a vertical acceleration of the aircraft;
- detect an airspeed of the aircraft;
- determine if the aircraft is in one of a near stalled condition and a stalled condition based upon at least the calculated new vertical velocity error of the aircraft and a polarity of the new vertical velocity error of the aircraft;
- determine if a timer has expired if the aircraft is in one of a near stalled condition and a stalled condition; and
- return control of the aircraft to the aircraft operator if the aircraft is not in one of a near stalled condition and a stalled condition;

wherein the software is incorporated into a flight control computer.

15. The software, according to claim 14, operable to:
- determine if the vertical velocity error exceeds the vertical velocity error threshold and the polarity of the vertical velocity error is in a direction indicating a stall or near-stall condition.

16. The software, according to claim 15, operable to calculate the vertical velocity error of the aircraft by subtracting the actual vertical velocity from the commanded vertical velocity.

17. The software, according to claim 14, operable to:
- determine if the new vertical velocity error is within a vertical velocity error threshold;
- determine if the vertical acceleration is within a vertical acceleration threshold; and
- determine if the actual airspeed exceeds an airspeed threshold.

18. The software, according to claim 17, operable to determine if the new vertical velocity is within the vertical velocity threshold by subtracting the new vertical velocity from the commanded velocity to produce a new vertical velocity error and comparing the new vertical velocity error to a vertical velocity threshold.

19. The software, according to claim 14, wherein the software is on-board the aircraft.

20. The software, according to claim 14, wherein the software in incorporated into a flight operations system operable to control a remotely piloted vehicle.

* * * * *